Feb. 3, 1970
CHI FANG TUNG ET AL
3,493,403
HIGH TITANIA GLASS ARTICLES AND PROCESS
Filed Aug. 12, 1968

INVENTOR.
CHI FANG TUNG
WARREN R. BECK
BY Kinney Alexander,
Sell, Steldt & DeLaHunt
ATTORNEYS United States Patent Office 3,493,403
Patented Feb. 3, 1970

3,493,403
HIGH TITANIA GLASS ARTICLES AND PROCESS
Chi Fang Tung, Lincoln Township, Washington County, and Warren R. Beck, Mahtomedi, Minn., assignors to Minnesota Mining and Manufacturing Company, St. Paul, Minn., a corporation of Delaware
Continuation-in-part of application Ser. No. 258,576, Feb. 14, 1963. This application Aug. 12, 1968, Ser. No. 751,914
Int. Cl. C03c *3/12;* C04b *35/46;* G02b *1/00*
U.S. Cl. 106—47     13 Claims

ABSTRACT OF THE DISCLOSURE

Refractory light-transmitting articles of glass no greater than 2 millimeters in thickness, said glass having a refractive index of at least 2.1 and scattered crystallinity up to about 5 weight percent and characterized by a composition which includes at least two metal oxides selected from those set forth in the drawing and within the weight percentage therein and which by weight satisfies all of the following requirements:
  (a) at least 85% consists of two or more metal oxides within the refractory square of the drawing, one of which is $TiO_2$ in an amount from 55 to 90%, with any CaO content from said refractory square being not in excess of 20%; and
  (b) no more than 10% consists of one or more metal oxides volatilizing at a temperature up to 1800° C.
and processes for their manufacture.

---

This application is a continuation-in-part of United States Ser. No. 258,576, filed on Feb. 14, 1963.

This invention relates to our discovery of new light-transmitting glass articles or elements of highly refractory composition and high refractive index. The invention also relates to a method for making these new glass elements.

Heretofore man-made glass articles with a refractive index ($n_D$) as high as that of diamonds (i.e., 2.4) have been possible. However, the composition required for making prior art high index glass has usually required some quantity of relatively low-melting inorganic oxide constituents. Ordinarily constituents known to be glass-formers have been necessary in prior art practice. Lead oxide is a constituent heretofore frequently used in higher refractive index glass elements, and has caused the glass elements to appear distinctly yellow in bulk form under daytime lighting conditions. Further, lead oxide has been known to contribute to the darkening of these glasses on exposure to sunlight, a phenomena known as "solarizing."

We have found it possible to prepare high index glass elements which exhibit a refractive index of at least 2.1 and up to approximately 2.7, or possibly slightly higher, using compositions of highly refractory character not prior to our invention believed to be recognized as capable of being formed into a light-refractive glass. For example, the composition of our glasses includes large amounts of titanium dioxide. Heretofore, very high titanium dioxide systems have been considered impossible to form into glass.

According to the invention, high index glass of refractory composition may be formed so as to be essentially clear or colorless under reflex-reflecting conditions. Elements of the invention which are essentially colorless under reflex-reflecting conditions exhibit only the slightest tint of color (in many cases, they exhibit a white appearance) in bulk form under daytime diffuse lighting conditions.

Glass elements of our invention are mechanically strong and highly resistant to weathering. Under exposure to sunlight, they are highly resistant to discoloration (i.e., highly resistant to "solarizing").

Our articles or elements have at least one dimension which is no larger than 2 millimeters, preferably no larger than 250 microns. Quenching of greater thicknesses is difficult to accomplish in a manner satisfactory to form elements or articles of substantially uniform glass character throughout.

In the form of flakes and fibers, our elements may be used to create attractive jewelry and wearing apparel items. Glass articles or elements of the invention, particularly those in flake form, may be embedded in media of other refractive index to produce products exhibiting light polarization effects.

Spheroidal glass elements of the invention are especially useful in reflex-reflecting structures of varied types. For reflex-reflecting use, our spheroidal elements should have a diameter from about a few microns or so up to approximately 100 microns, or 150 microns, or possibly even somewhat larger, say 250 microns. Preferably, however, the diameter range will lie between the limits of approximately 10 to 75 microns for most reflex-reflecting applications.

Compositions for our glass elements have an extremely strong tendency to devitrify and are so refractory that special techniques have been developed for conversion of the same into light-transmitting glass. Contrary to prior practice, which generally has involved the steps of melting a large bulk or batch of raw materials necessary to formulate the glass, the elements hereof are preferably fused into glass after first splitting or shaping the non-melted raw material mixture into particles having the approximate small bulk or the glass articles or elements to be formed. Further, in our preferred method, we subject fragments or small articles of raw material to extraordinarily high fusion temperatures in an intense flame environment for only a very brief or minute period of time (e.g., on the order of a fraction of a second or so up to several seconds, possibly as long as 5 seconds). We follow the heat-fusion step by rapid quenching which suitably is accomplished by merely allowing the briefly intensely heated particles to pass through air at room or even higher temperatures up to about 600° C., or through a water spray.

In describing our glasses, we have chosen to set forth various constituents of their composition in individual oxide form, as has been customary in this art heretofore. Of course, the exact form that various constituents in glass may take is not definitely known; however, the practice followed herein (e.g., setting forth metal oxides as they are presumptively present in the glass) has been considered by glass technologists to be the most convenient and practical from the standpoint of rapid comprehension.

The highly refractory character of the composition of our glass is quickly understood by describing our glasses with reference to a drawing, made a part hereof, wherein various oxides of metals are set forth in table form in the position that the metals occupy in a known periodic table of the elements. In the drawing, certain data is set forth within the small square for each identified metal oxide. As illustrated by the separate enlargement of the square for $TiO_2$ in the drawing, this data includes the atomic number of the metal (upper left corner), the melting point of the oxide in degrees centigrade (upper right corner), the vaporization or volatilization temperature (i.e., the boiling, sublimation, or decomposition temperature) of the metal oxide in cases where that temperature is no higher than 1800° C. (immediately underneath the melting temperature), and the preferred permissible weight percentage range for the oxide in our compositions (below each identified metal oxide). Metals having more than one state of oxidation are illustrated with the state of oxidation in which they are presumptively present in our final articles of glass. Where melting temperatures for an oxide are above 1800° C., but the specific temperature is unknown, a dash line is used and the volatilization temperature is, of course, omitted. For all metal oxides volatilizing above 1800° C., no volatilizing temperature is given. Where volatilization of the metal oxide occurs at a temperature up to about 1800° C., but the specific volatilization temperature is not known, a V is placed in the position of the volatilization temperature space in the drawing. Oxides of metals within the heavy-lined large square of the drawing are hereinafter called "refractory square" oxides (i.e., CaO, SrO, BaO, $Sc_2O_3$, $Y_2O_3$, $La_2O_3$, $TiO_2$, $ZrO_2$, and $HfO_2$).

Most oxides of metals within the refractory square of the drawing seem to have, as a practical matter, only one stable state of oxidation. Titanium is of course one exception. It may exist as $TiO_2$, its highly oxidized state, or in a lower state of oxidation. For example, $Ti_2O_3$ (which may be a mixture of the oxides of $Ti^{+2}$ and $Ti^{+4}$) is a lower state of oxidation which exhibits a black or blue-black appearance. Possibly prior art workers who have stated that $BaO$-$TiO_2$ systems are not glass-forming were deterred in their efforts if they observed this tendency of $TiO_2$. It appears that the flame environment for gaining the intense temperature for conversion of raw materials into the homogeneous and amorphous glass state frequently causes a reduction of a small portion of the raw material which should be in an oxidized state, usually a highly oxidized state, in the final article in order to gain a substantially transparent or highly light-transmitting glass of attractive color or colorless character. Where this occurs, and it frequently occurs to a small degree, we find it desirable to subject the glass elements formed by direct flame fusion and subsequent rapid quenching to a further heat treatment under oxidizing conditions sufficient to oxidize any reduced metals to such an extent (particularly any reduced titanium to $Ti^{+4}$) as to convert the glass elements in bulk form to a lighter color or white state as observed under daylight conditions. Glass elements which appear white in bulk form under daylight conditions have generally been found to be essentially colorless under reflex-reflecting conditions (i.e., light transmitted through such elements appears to be colorless). Surprisingly, the heating involved in such treatment generally also serves to cause increase in the refractive index of our glass.

The composition of our glasses will preferably include at least about 85% or 90% or more (even 100%) by weight of two or more oxides of metals falling within the refractory square of the drawing. Although the composition includes at least two refractory square oxides, only one ($TiO_2$) from that square is critically required. No more than about 15%, preferably no more than 10% of the composition of our glass articles will be accounted for by metal oxides melting at a temperature lower than but up to 1800° C. (Within this group of lower melting oxides are oxides which also volatilize below about 1800° C., as discussed hereinafter.) Oxides for the glass, where elements of the lightest color or tint (or white) under daylight conditions are desired, should be selected for their lack of tendency to impart a strong color to the final article. But oxides tending to promote coloration of the glass (e.g., cobalt oxide) may be employed where desired.

All glasses of the invention contain at least two metal oxides, one of which may be present to the extent of only a percent or so but will be present. Under all circumstances at least 55% by weight of our glass elements consists of $TiO_2$. As the content of $TiO_2$ increases (e.g., above 55%, above 60%, above 65%, etc.) refractive index generally increases; thus glasses containing higher and higher amounts of $TiO_2$ above the lower minimum are preferred. However, from the standpoint of major convenience of glassformation using our special process, the content of $TiO_2$ preferably will not exceed in most cases about 90% by weight.

It is possible to use any one or more metal oxide which is set forth in the drawing with a lower percent limit of zero as an optional ingredient in our highly refractory high index glasses, whether or not the metal oxide is within the refractory square. It should be observed that the maximum upper percentage limits are set forth in the drawing for optional oxides. It is fitting to note that metal oxides which volatilize at temperatures up to 1800° C. (which oxides in general exhibit—in separate state without other oxides present—a vapor pressure of about one atmosphere or more at temperatures up to about 1800° C.) will generally not be used in our compositions to any great or significant amount, or if used, will generally not remain as a significantly large constituent in the glass of our final elements. They wall not account for any quantity more than about 15% by weight of the glass; and usually, they will not account for more than 5 or possibly 10% by weight of the glass. This last is particularly true where more highly volatile metal oxides such as $P_2O_5$, $As_2O_3$, $Li_2O$, $Na_2O$, $Tl_2O$, etc. (which in individual states exhibit vapor pressures of one atmosphere at relatively low temperatures up to about 1500° C.) happen to be present in the original raw material used in glassforming. Excellent results are achieved by avoiding use of highly volatile oxides.

It should be pointed out, however, that some volatilization of many different metal oxides from a raw material batch from which our glass is formed may possibly occur under the extremely high temperature employed for our preferred glassforming step. The amount of volatilization of high melting (e.g. above 1800° C.) or refractory oxides is negligible from the standpoint of approximate compositional analysis; and of course, volatilization in all instances will depend upon such factors as the specific temperature attained by the article in the process of manufacture, the vapor pressure of specific oxides as against atmospheric plus surface tension forces, the diffusion rate of volatilized material through the heated article, complicating factors such as the particular balance and type of raw materials in a raw mixture, etc. In the case of the oxides characterized as volatile herein, the amount of volatilization may reach proportions sufficient to cause a loss of heat and commensurate reduction of the otherwise obtainable temperature reached by the article in the flame; thus, from the standpoint of processing, the presence of large amounts (e.g., more than about 10 or 15%) of highly volatile oxides in a raw material batch is not usually desired where solid glass elements are to be formed. But, highly volatile oxides (the amount depending upon the overall composition of the glass, the specific volatile oxide, and the temperature at which its vapor pressure reaches one atmosphere) are desirable in a raw batch designed for conversion into hollow or vesicular glass elements (useful, for example, as fillers for resinous structures). The resulting glass, however, will satisfy the oxide percentage requirements aforediscussed, even though the interior may have a condensed film of the volatile oxide.

We have also found that some high melting (above 1800° C.) oxides behave more pronouncedly than others in promoting the formation of a homogeneous transparent glass in our highly refractory system. Illustrative of these oxides are BeO, MgO, CaO, $La_2O_3$, $Ta_2O_5$, $Di_2O_3$, and, in general, the oxides of any of the rare earths (e.g., preferably $CeO_2$, $Pr_2O_3$, $Nd_2O_3$, $Pm_2O_3$, $Sm_2O_3$, and $ThO_2$). Didymium oxide ($Di_2O_3$) is particularly effective for this purpose. It is properly a mixture of oxides, but is conveniently considered as a single material. Its composition consists of, by weight, 45.5% lanthanum oxide ($La_2O_3$), 11% praseodymium oxide ($Pr_6O_{11}$), 38% neodymium oxide ($Nd_2O_3$), 4% samarium oxide ($Sm_2O_3$), and 0.4% yttrium oxide ($Y_2O_3$), with the remaining 1.1% accounted for by rare earth oxides or impurities. The oxides noted to promote the formation of transparent homogeneous glass in our highly refractory systems may be looked upon as crystallization inhibitors. They serve as crystallization inhibitors even when used in very small amounts, although some are more effective for this purpose than others. Contents of these oxides on the order of a fraction of a percent by weight up to about 20% by weight are most practical. Economy will ordinarily dictate that the more expensive crystallization inhibitors (e.g., BeO, $Ta_2O_5$ and the rare earths) will be used sparingly, preferably in amounts not over about 5% by weight of the total glass composition.

In manufacturing our glass elements, we first select raw material ingredients calculated to give, after treatment, final glass articles having the approximate compositional analysis described. These ingredients may be complex raw materials (e.g., chlorides, carbonates, metal organates, etc.) adapted to be converted during processing into the oxide form for the glass composition; or they may be, and preferably are in most instances, oxides of metals as they are presumptively present in the final glass. Commercially available raw materials may, of course, contain so-called impurities. A notable example is commercially available $ZrO_2$, which may contain as high as 15% by weight or more of $HfO_2$. Such is not objectionable, and in fact offers a convenient way to add small quantities (as present in commercially available $ZrO_2$ used in making glasses illustrated herein) of $HfO_2$ to our system. Of more importance is the fact that as much as about 10% by weight or possibly more of our final articles may be accounted for by inorganic ingredients not specifically recited herein or in the drawing; and this is true without loss of the other required properties so long as the other requirements noted herein are observed.

The raw materials selected for the glass charge are pulverized and intimately blended together, as by milling in a volatile liquid media such as water, until they are converted to a mass of particles of near colloidal size or at least of finely divided or pigment size. During blending, we may add a small quantity of temporary binder material such as dextrine, starch or other suitable organic burn-out binder in an amount sufficient to bind together the raw material particles to form small articles having the approximate bulk desired for conversion to our glass elements.

Then the milled material is dried; and this step may conveniently be conducted in such manner as to simultaneously form small articles having the bulk desired for conversion to the glass state. For example, the slurry blend of material may be dried by spraying it into a dry atmosphere maintained at an elevated temperature. This temperature will usually be near or above the volatilization temperature of the liquid volatile media of the slurry but not sufficiently high to burn out the temporary organic binder under the conditions of drying. Generally air temperatures between approximately 100° F. and 500° F. are preferred where an organic binder is used. But higher temperatures (e.g., up to about 1600° C.) for drying may be useful, particularly where an organic binder is omitted or where some sintering is accomplished simultaneously with drying. The resulting dried small articles may be converted directly into glass, or if desired, may be screened at this point to separate those within a limited size range for conversion into glass.

Where an organic binder is not employed, we find it convenient to allow the slurry of material from the ball mill to dry into a cake and then sinter the cake, usually at temperatures in the range of about 1000° C. to 1600° C. Sintering serves to bond the minute particles of the cake sufficiently to permit crushing of the cake into articles of the size or bulk desired for conversion to glass without excessive creation of fines.

Conversion of the discrete articles of blended raw material into a homogeneous amorphous state is accomplished in a surprisingly rapid and almost instantaneous manner by passing the articles through an extraordinarily high temperature flame environment such as that created by a plasma torch or oxyacetylene torch or the like. Plasma jet or flame systems are now well known, see for example U.S. patent by M. L. Thorpe, No. 2,960,594, granted Nov. 5, 1960. Extraordinarily high temperatures (at least 5,000° F. up to 30,000° F.) are reached in the flame environment of a plasma torch or oxyacetylene torch. Of course, the temperature reached by the raw material particles rapidly passing through the flame will be lower than that of the flame itself. Exact temperature readings for the raw material in the conversion step have been impossible to obtain. We are confident, however, that the temperature to which raw material converted to glass is subjected is well in excess of ordinary glass melting temperatures. In fact, the temperatures used appear to be well in excess of the minimum temperature at which we believe a glass melt having our compositional analysis may possibly be formed; but we have found such extreme temperatures to give excellent results and useful results and to be needed for effective conduct of the essentially instantaneous glassforming process hereof. When the small articles are dropped through the intense heat of a plasma flame, their composition is rapidly fused into a homogeneous amorphous state; and this state is maintained as the articles fall out of the high temperature environment and pass through air, or a water spray, which serves to quench the fused composition of the small articles. In effect, by this procedure the small articles essentially instantaneously reach a state where the blend of raw ingredients of the articles becomes sufficiently fluid to cause the mass thereof to assume a spheroidal or droplet form while free-falling or suspended in gas currents such as created by the flame; and then the spheroids are sufficiently and rapidly quenched to retain their amorphous state and spheroidal form by merely passing them through air or a water spray in a continued free-falling or air suspended state.

Should glass elements of a form other than the spheroidal be desired, impingment or spinning of particles from the high temperature environment upon a surface (suitably at ordinary air or environmental temperature) may be employed. For example, articles passing through a plasma torch (e.g., a commercial plasma jet known as "F–80") become so hot that they will form into flakes when dropped out of the flame upon the surface of a collector pan held at room temperature, or even higher temperatures up to about 600° C. Fibers have been formed by employing exceedingly high temperatures and causing the small fluid droplets to strike the edges or sides of a collector pan maintained at a tempertaure below about 600° C. Varied techniques, including grinding or polishing, may be employed to gain other desired physical shapes or forms for the elements.

A single batch of small articles subjected to the rapid glassforming process may result in the formation of some hazy articles amongst transparent glass articles, frequently with discoloration of both the hazy and transparent articles. Transparent elements not severely discolored, of course, possess the requisite light-transmitting properties and desirable coloration to be directly useful in refractive applications. And this useful light-transmitting property has surprisingly also been found to be true for most articles which exhibit some haziness. Strong discoloration, however, presents a different problem. Such discoloration generally assumes the form of blackening or graying, which appears primarily to be caused by the reduction of some portion of titanium to a lower state of oxidation than $Ti^{+4}$. To correct such discoloration, further heat treatment of the glass for a period varying from two or three minutes to about one hour (or possibly longer) at temperatures sufficient to oxidize reduced titanium (e.g., between about 600° C. and 1000° C.) may be employed to convert the glass articles into lighter-colored light-transmitting or transparent glass elements.

At temperatures sufficient to oxidize the titanium (as well as possibly oxidize other constituents which may possibly have undergone some reduction during glass formation), the refractive index of the glass articles usually undergoes an alteration upwardly to a varied extent depending upon the temperature, time and composition of the glass undergoing treatment. For example, lower temperatures and shorter times tend to reduce the extent of increase in refractive index of the glass as compared to the results gained with somewhat higher temperatures and longer times of treatment. However, higher temperatures (such as those around 1000° C. or higher) with longer times (e.g., 2 hours) of treatment are not recommended inasmuch as the glass, when subjected to elevated temperatures for lengthy periods, is gradually converted toward a polycrystalline state, which commensurate reduction of refractive light-transmitting properties.

Some scattered crystallinity occasioned by slight devitrification is, of course, not objectionable and may be present as a desirable phase in almost any glass. The noted haziness of some of our glass articles as they exist directly after flame fusion is believed to be caused by a minor crystalline phase which is not objectionable. In this respect, the term "glass" as used herein, means that the elements referred to as glass elements are substantially homogeneous and amorphous throughout but may in each individual element contain a small amount of ingredients present in crystalline form so long as the amount of such crystalline ingredients is at a susbtantially reduced level (e.g., believed not to exceed about 5% by weight of the glass elements) such that the crystalline ingredients present do not substantially interfere with the transmission and refraction of light by the glass (i.e., the predominate homogeneous amorphous phase of the elements).

The following is offered as a specific illustration of a method for making our glass articles or elements.

222 grams of colloid anatase titanium dioxide and 78 grams strontium carbonate were milled together for 22 hours in a jar mill with alumina pebbles and sufficient water to yield a thick slurry. This milled product was then dried as a cake for 4 hours at 120° C., and the cake sintered over a 30 minute firing cycle in an oven maintained at a continuous temperature of 1200° C. The sintered cake was crushed in a disc pulverizer and the resulting particles screened through a 170 mesh U.S. standard wire screen (88 microns). The particles were elutriated in water to float off those below about 20 microns size. Particles above about 20 microns and below about 90 microns (e.g., 170 mesh) were then de-ironed (to remove the possibility of iron coloring) by stirring with a hand "alnico" magnet; and those particles attracted to the magnet were removed. Then the material was dried in an oven at roughtly 100° C. for about ½ hour.

Resulting pulverulent material was dropped in a free-falling manner through the flame of an arc gas device known as a F–40 helium plasma torch or jet. It was operated at maximum power of 40 kw. using 500 amperes to produce an inert gas stream of extraordinarily high temperature of at least about 10,000° F. The free-falling particles melted sufficiently under the temperature conditions involved in treatment to form themselves into spheroidal shapes by surface tension. They were quenched by spraying them with tap water as they fell from the zone of heat fusion.

Resulting dark glass spheroids (refractive index 2.29) were then heated in air for about 5 minutes at 800° C. They were thus converted into a substantially white color as viewed under daylight conditions in bulk form. Under reflex-reflecting conditions, they were essentially colorless and transparent, with a refractive index of approximately 2.4. They contained about 74.0 percent by weight titanium dioxide and 26.0 percent by weight strontium oxide.

In Table I below several illustrative glass compositions of the invention are set forth in both weight percent and mol percent, with the mol percents in parentheses. In Table II the following is set forth for the illustrative glass compositions: (a) the refractive index of the glass formed as a result of the flame fusion step of manufacture, (b) the estimated percentage of light-transmitting elements (which in each case are substantially all transparent glass elements) resulting directly from the flame fusion step, (c) the temperature of special heat treatment (which was for thirty minutes where such treatment was used) in ° C., (d) the refractive index as a result of the special heat treatment, (e) the percent of light-transmitting elements (whether transparent or somewhat hazy) resulting after the special heat treatment, and (f) the color of light transmitted through the glass after special heat treatment, or the color of such light after the flame fusion step where the special heat treatment was not used.

As aforenoted, it is the refractive light-transmitting properties of the glass elements which make them especially useful in reflex-reflecting and light-refractive applications; thus this property is specially noted in the table. Where desired, the light-transmitting elements may be separated from the others; but opacity for some percentage of the articles or elements in a mass or batch of the same is not objectionable even in reflex-reflecting applications. This is particularly true when masses of the elements of this invention are used, since the effective light-refracting glass elements in a mass are highly efficient light refractors and posses other desirable properties of durability and appearance under daytime conditions as well as under reflex-reflecting conditions.

TABLE I

| No. | $TiO_2$ | $ZrO_2$ | BaO | SrO | Other |
|---|---|---|---|---|---|
| 1 | 74.0 (78.6) | | | 26.0 (21.4) | |
| 2 | 60.0 (69.8) | 40.0 (30.2) | | | |
| 3 | 80.0 (86.0) | 20.0 (14.0) | | | |
| 4 | 60.0 (66.0) | | | 40.0 (34.0) | |
| 5 | 62.5 (76.1) | | 37.5 (23.9) | | |
| 6 | 60.0 (68.0) | 20.0 (14.7) | | 20.0 (17.3) | |
| 7 | 70.0 (78.2) | | 15.0 (8.8) | 15.0 (13.0) | |
| 8 | 70.0 (75.0) | 15.0 (11.5) | | 15.0 (12.4) | MgO, 0.5 (1.1) |
| 9 | 60.0 (68.8) | 10.0 (7.5) | 10.0 (6.0) | 20.0 (17.7) | |
| 10 | 60.0 (71.9) | 20.0 (15.6) | 20.0 (12.5) | | |
| 11 | 70.0 (75.7) | | 3.0 (1.7) | 27.0 (22.6) | |
| 12 | 70.0 (83.6) | | | 7.5 (6.9) | $Y_2O_3$, 22.5 (9.5) |
| 13 | 70.0 (85.5) | | 7.5 (4.8) | | $Y_2O_3$, 22.5 (9.7) |
| 14 | 80 (73.7) | | | | CaO, 20.0 (26.3) |
| 15 | 85 (79.9) | | | | CaO, 15.0 (20.1) |
| 16 | 67.4 (69.8) | 14.4 (10.7) | | 14.4 (11.6) | MgO, 3.8 (7.9) |
| 17 | 68.6 (75.1) | 14.7 (11.5) | | 14.7 (12.5) | $Rb_2O$, 2.0 (0.9) |
| 18 | 68.6 (75.1) | 14.7 (11.5) | | 14.7 (12.4) | $Cs_2O$, 2.0 (1.0) |
| 19 | 67.3 (71.8) | 14.4 (11.0) | | 14.4 (11.9) | $Na_2O$, 3.9 (5.3) |
| 20 | 69.7 (76.4) | 14.9 (10.6) | | 14.9 (12.7) | $Sc_2O_3$ 0.5 (0.3) |
| 21 | 64.8 (59.7) | 13.9 (8.3) | | 13.9 (9.9) | BeO, 7.4 (22.1) |
| 22 | 66.5 (75.7) | 14.3 (10.6) | | 14.3 (12.5) | $Di_2O_3$, 4.9 (1.2) |
| 23 | 64.8 (75.4) | 13.9 (10.5) | | 13.9 (12.5) | $Ta_2O_5$, 7.4 (1.6) |
| 24 | 64.8 (74.7) | 13.9 (10.4) | | 13.9 (12.4) | $ThO_2$, 7.4 (2.6) |
| 25 | 64.8 (75.1) | 13.9 (10.5) | | 13.9 (12.4) | $La_2O_3$, 7.4 (2.1) |
| 26 | 69.7 (75.6) | 14.9 (11.6) | | 14.9 (12.5) | $CeO_2$, 0.5 (0.30) |
| 27 | 80.0 (74.01) | | | | CaO, 15.0 (19.82) $SiO_2$, 5.0 (6.17) |
| 28 | 70.0 (90.7) | | | | $Y_2O_3$, 30.0 (9.3) |
| 29 | 55.0 | | 27.5 | b.0 | ZnO, 12.5 |
| 30 | 55.0 | | 27.5 | 2.5 | ZnO, 15.0 |
| 31 | 55.0 | | 27.5 | 2.5 | ZnO, 10.0 $SiO_2$, 5.0 |

TABLE I—Continued

| No. | TiO₂ | ZrO₂ | BaO | SrO | Other |
|---|---|---|---|---|---|
| 32 | 55.0 | | 27.5 | 2.5 | ZnO, 10.0<br>PbO, 5.0 |
| 33 | 55.0 | | 27.5 | 2.5 | ZnO, 10.0<br>CdO, 5.0 |
| 34 | 55.0 | | 27.5 | 2.5 | ZnO, 10.0<br>WO₃, 5.0 |
| 35 | 55.0 | | 27.5 | 2.5 | ZnO, 10.0<br>Na₂O, 5.0 |
| 36 | 55.0 | | 27.5 | 2.5 | ZnO, 7.5<br>Ta₂O₅, 7.5 |

TABLE II

| No. | (a) | (b) | (c) | (d) | (e) | (f) |
|---|---|---|---|---|---|---|
| 1 | 2.16 | 100 | 750 | 2.26 | 100 | Colorless. |
| 2 | 2.29 | 85 | 800 | 2.4 | 85 | Do. |
| 3 | 2.29 | 90 | 900 | 2.4 | 90 | Do. |
| 4 | 2.5 | 60 | 900 | 2.55 | 60 | Do. |
| 5 | 2.18 | 50 | 750 | 2.36 | 50 | Do. |
| 6 | 2.24 | 95 | 900 | 2.36 | 95 | Tan tint. |
| 7 | 2.29 | 98 | 950 | 2.40 | 98 | Colorless. |
| 8 | 2.29 | 90 | 950 | 2.44 | 90 | Do. |
| 9 | 2.33 | 80 | 900 | 2.43 | 80 | Do. |
| 10 | 2.23 | 98 | 900 | 2.35 | 95 | Do. |
| 11 | 2.32 | 95 | 900 | 2.38 | 90 | Tan tint. |
| 12 | 2.27 | 90 | 900 | 2.40 | 90 | Colorless. |
| 13 | 2.32 | 95 | 1,050 | 2.58 | 90 | Do. |
| 14 | 2.30 | 99 | 950 | 2.36 | 90 | Do. |
| 15 | 2.30 | 80 | 800 | 2.38 | 70 | Do. |
| 16 | 2.31 | 20 | 800 | 2.40 | 20 | Do. |
| 17 | 2.29 | 90 | 900 | 2.37 | 90 | Do. |
| 18 | 2.33 | 80 | 900 | 2.55 | 90 | Do. |
| 19 | 2.33 | 85 | 850 | 2.40 | 85 | Do. |
| 20 | 2.34 | 60 | 850 | 2.42 | 50 | Tan tint. |
| 21 | 2.34 | 80 | 900 | 2.42 | 80 | Do. |
| 22 | 2.22 | 80 | 850 | 2.31 | 80 | Do. |
| 23 | 2.30 | 85 | 900 | 2.38 | 85 | Do. |
| 24 | 2.28 | 90 | 950 | 2.44 | 90 | Do. |
| 25 | 2.28 | 90 | 950 | 2.39 | 90 | Do. |
| 26 | 2.28 | 100 | 1,000 | 2.54 | 100 | Do. |
| 27 | 2.35 | 50 | 900 | 2.47 | 50 | Orangy. |
| 28 | 2.30 | 50 | 800 | 2.35 | 50 | Colorless. |
| 29 | 2.29 | 80 | | | | Blue. |
| 30 | 2.160 | 90 | 775 | 2.194 | 90 | Colorless. |
| 31 | 2.21 | 90 | 775 | 2.25 | 90 | Do. |
| 32 | 2.13 | 99 | 775 | 2.16 | 99 | Do. |
| 33 | 2.16 | 95 | 775 | 2.2 | 95 | Do. |
| 34 | 2.165 | 99 | 775 | 2.19 | 99 | Do. |
| 35 | 2.18 | 95 | 775 | 2.26 | 95 | Do. |
| 36 | 2.100 | 100 | 775 | 2.16 | 100 | Do. |
| 37 | 2.175 | 98 | 775 | 2.225 | 98 | Do. |

What is claimed is:

1. Refractory light-transmitting articles of glass no greater than 2 millimeters in thickness, said glass having a refractive index of at least 2.1 and scattered crystallinity up to about 5 weight percent and characterized by a composition which includes at least two metal oxides selected from those set forth in the drawing and within the weight percentage therein and which by weight satisfies all of the following requirements:

(a) at least 85% consists of two or more metal oxides within the refractory square of the drawing, one of which is TiO₂ in an amount from 55 to 90%, with any CaO content from said refractory square being not in excess of 20%; and (b) no more than 10% consists of one or more metal oxides volatilizing at a temperature up to 1800° C.

2. The refractory light-transmitting articles of claim 1 in which said TiO₂ content is at least 60%.

3. Refractory light-transmitting articles of claim 1 in which at least 90% of said composition consists of two or more metal oxides within said refractory square.

4. Refractory light-transmitting articles of glass no larger than 250 microns in thickness, said glass having a refractive index of at least 2.1 and scattered crystallinity up to about 5 weight percent and characterized by a composition which includes at least two metal oxides selected from those in the drawing and within the weight percentages therein and which by weight satisfies the following requirements:

(a) at least 85% consists of two or more metal oxides within the refractory square of the drawing, one of which is TiO₂ in an amount from 55 to 90%, with any CaO content from said refractory square being not in excess of 20%; and (b) no more than 10% consists of one or more metal oxides volatilizing at a temperature up to 1800° C.

5. Refractory light-transmitting articles of claim 4 in which at least 90% of said composition consists of two or more metal oxides within said refractory square.

6. The refractory light-transmitting articles of claim 5 in which said TiO₂ content is at least 60%.

7. Refractory light-transmitting spheroidal elements of glass no greater than 250 microns in diameter, said glass having a refractive index of at least 2.1 and scattered crystallinity up to about 5 weight percent and characterized by a composition which includes at least two metal oxides selected from those in the drawing and within the weight percentages therein and which by weight satisfies all of the following requirements:

(a) at least 85% consists of two or more metal oxides within the refractory square of the drawing, one of which is TiO₂ in an amount from 55 to 90%, with any CaO content from said refractory square being not in excess of 20%; and (b) no more than 10% consists of one or more metal oxides volatilizing at a temperature up to 1800° C.

8. The refractory light-transmitting spherodial elements of claim 7 in which said TiO₂ content is at least 60%.

9. Refractory light-transmitting spheroidal elements of claim 7 in which at least 90% of said composition consists of two or more metal oxides within said refractory square.

10. The process of making articles of glass having at least one dimension no greater than 2 millimeters in thickness and wherein the glass has a refractive index of at least 2.1 and scattered crystallinity up to about 5 weight percent comprising the steps of (1) momentarily passing raw material particles through a flame having an intense temperature of at least 5,000° F. up to 30,000° F. and at least high enough to fuse the ingredients of said particles within seconds into a homogeneous state, said raw material particles each consisting essentially of a blend of finely-divided ingredients sintered together as a particle and adapted to be converted into a homogeneous state having a composition including at least two metal oxides selected from the drawing and within the weight percentages therein, at least 85% by weight of which consists of two or more metal oxides within the refractory square of the drawing, one of which is TiO₂ in an amount from 55 to 90% and no more than 10% consists of one or more metal oxides volatilizing at a temperature up to 1800° C., and (2) rapidly quenching said resultant homogeneous particles in an air-exposed environment within seconds after first fusing the ingredients thereof in said flame so as to convert said homogeneous particles into solid light-transmitting glass elements.

11. The process of claim 10 in which at least 90% of said composition consists of two or more metal oxides within said refractory square.

12. The process of making articles of glass having at least one dimension no greater than 2 millimeters in thickness and wherein the glass has a refractive index of at least 2.1 and scattered crystallinity up to about 5 weight percent comprising the steps of (1) momentarily passing raw material particles through a flame having an intense temperature of at least 5,000° F. up to 30,000° F. and at least high enough to fuse the ingredients of said particles within seconds into a homogeneous state, said raw material particles each consisting essentially of a blend of finely-divided ingredients sintered together as a particle and adapted to be converted into a homogeneous state having a composition including at least two metal oxides selected from the drawing and within the weight percentages therein, at least 85% by weight of which consists of two or more metal oxides within the refractory square of the drawing, one of which is TiO₂ in an amount from 55 to 90%, and no more than 10% consists of one or more metal oxides voltailizing at a temperature up to 1800° C., (2) rapidly quenching said resultant homogeneous particles in an air-exposed environment within seconds after first fusing the ingredients thereof in said flame so as to convert said homogeneous particles into solid light-transmitting glass elements, and (3) then heating said elements in an oxidizing atmosphere at an elevated temperature below the fusion temperature thereof, said heating being conducted for a time sufficiently long to oxidize any reduced titanium to $Ti^{+4}$ but insufficiently long to convert said elements into a crystalline state.

13. The process of claim 12 in which at least 90% of said composition consists of two or more metal oxides within said refractory square.

References Cited

UNITED STATES PATENTS

| | | | |
|---|---|---|---|
| 2,631,106 | 3/1953 | Mitkewith | 106—52 |
| 2,726,161 | 12/1955 | Beck et al. | 106—52 |
| 2,774,675 | 12/1956 | Slayter et al. | 106—47 |
| 2,790,723 | 4/1957 | Stradley et al. | 106—47 |
| 2,992,122 | 7/1961 | Beck et al. | 106—50 |
| 3,145,114 | 8/1964 | Rindone | 106—47 |
| 3,149,016 | 9/1964 | Tung et al. | 106—39 |
| 3,171,714 | 3/1965 | Jones et al. | 264—15 |
| 3,197,810 | 8/1965 | Bildstein | 65—21 |

FOREIGN PATENTS

| | | |
|---|---|---|
| 976,231 | 6/1954 | Germany. |
| 725,656 | 3/1955 | Great Britain. |
| 540,634 | 5/1957 | Canada. |

OTHER REFERENCES

Brownine—"Plasma—A Substitute for the Oxy-Fuel Flame," Welding Journal, September 1959, pp. 870–875.

Welding Engineer—July 1962, p. 32.

HELEN M. McCARTHY, Primary Examiner

U.S. Cl. X.R.

65—21; 106—52, 53, 54; 264—15

UNITED STATES PATENT OFFICE
CERTIFICATE OF CORRECTION

Patent No. 3,493,403                    Dated February 3, 1970

Inventor(s) CHI FANG TUNG and WARREN R. BECK

It is certified that error appears in the above-identified patent and that said Letters Patent are hereby corrected as shown below:

Column 9, Table II: In Table II, cancel the line containing Run No. 1 and renumber each of the remaining runs consecutively, beginning with Run No. 2 as Run No. 1 and ending with Run No. 37 as Run No. 36.

SIGNED AND SEALED
SEP 15 1970

(SEAL)
Attest:

Edward M. Fletcher, Jr.
Attesting Officer

WILLIAM E. SCHUYLER, JR.
Commissioner of Patents